(12) United States Patent
Wang et al.

(10) Patent No.: US 9,848,054 B2
(45) Date of Patent: Dec. 19, 2017

(54) GATEWAY USING SINGLE DATABASE

(71) Applicant: JSW Pacific Corporation, New Taipei City (TW)

(72) Inventors: Hsien-Hsiu Wang, New Taipei (TW); Yin-Chung Chen, New Taipei (TW)

(73) Assignee: JSW PACIFIC CORPORATION, New Taipei (TW)

( * ) Notice: Subject to any disclaimer, the term of this patent is extended or adjusted under 35 U.S.C. 154(b) by 301 days.

(21) Appl. No.: 14/588,906

(22) Filed: Jan. 3, 2015

(65) Prior Publication Data

US 2015/0237154 A1    Aug. 20, 2015

(30) Foreign Application Priority Data

Feb. 14, 2014  (TW) ................................ 103202658

(51) Int. Cl.
*H04L 29/08* (2006.01)
*H04W 4/00* (2009.01)

(52) U.S. Cl.
CPC .............. *H04L 67/28* (2013.01); *H04L 67/02* (2013.01); *H04L 67/025* (2013.01); *H04W 4/006* (2013.01)

(58) Field of Classification Search
CPC ....... H04L 67/02; H04L 67/025; H04L 67/28; H04W 4/006
See application file for complete search history.

(56) References Cited

U.S. PATENT DOCUMENTS

| | | | | |
|---|---|---|---|---|
| 2005/0216302 A1* | 9/2005 | Raji | ....................... | G06Q 30/02 705/314 |
| 2007/0005736 A1* | 1/2007 | Hansen | ............... | H04L 41/0806 709/220 |
| 2007/0249319 A1* | 10/2007 | Faulkner | ................... | H04L 1/22 455/402 |
| 2007/0255348 A1* | 11/2007 | Holtzclaw | ............ | A61B 5/0002 607/60 |
| 2007/0286369 A1* | 12/2007 | Gutt | ...................... | H04L 67/125 379/127.01 |
| 2009/0070436 A1* | 3/2009 | Dawes | ................... | G06Q 30/02 709/219 |
| 2010/0185753 A1* | 7/2010 | Liu | ..................... | H04L 65/4084 709/219 |

(Continued)

*Primary Examiner* — Joe Chacko
(74) *Attorney, Agent, or Firm* — Chun-Ming Shih; HDLS IPR Services

(57) ABSTRACT

A gateway using a single database at least has a microprocessor unit and a Radio Frequency (RF) module. The RF module is used to be paired with an external sensor for connection. There is a main operating system operating in the microprocessor unit. In the main operating system, there is a integrated control system. The integrated control system integrates and records point-to-point (P2P) connection function, web page connection function and definition of operating data and instructions to the sensor for the gateway. With the integration of the integrated control system, a sensor operating system, a P2P control module and a web page connecting module in the main operating system share one main database to retrieve definition of the same data and instructions. With such, communication protocol problems among systems and modules in the main operating system are reduced and such design is helpful for developing and porting of firmware.

8 Claims, 5 Drawing Sheets

(56) References Cited

U.S. PATENT DOCUMENTS

| | | | |
|---|---|---|---|
| 2010/0217837 A1* | 8/2010 | Ansari | G06Q 30/04 709/218 |
| 2014/0081465 A1* | 3/2014 | Wang | G05B 13/02 700/276 |
| 2014/0214227 A1* | 7/2014 | Thornton | H02J 4/00 700/295 |
| 2015/0074259 A1* | 3/2015 | Ansari | H04L 67/02 709/224 |

* cited by examiner

GATEWAY USING SINGLE DATABASE

FIELD OF INVENTION

The present invention is related to a gateway and more particularly related to a gateway using a single database.

BACKGROUND OF THE INVENTION

Usually, conventional electronic devices rely on software execution to perform corresponding functions. In common software architectures, communication protocols among different program parts may be not unified because of different software programmers, different instruction formats, or other factors for different program parts corresponding to different functions.

As illustrated in FIG. 1, it is a diagram showing a related art gateway firmware. In this example, the gateway 1 includes a micro-controller 11. If a developer wants to configure the gateway 1 to connect to an external sensor 2 via a radio frequency (RF) module 12 and to transmit RF signals, a sensor operating system 111 is coded for the gateway 1 and the sensor operating system 111 has an independent sensor database 112 for storing definition of data and instructions of sensors.

In addition, if the developer wants to configure the gateway to be able to establish point-to-point (P2P) connection to a computer or a mobile phone, the developer needs to create a P2P connecting module 113 and the P2P connecting module 113 needs to have an independent main data base 114 for storing definition of data and instructions corresponding to P2P connecting function. Besides, if the developer wants to configure the gateway 1 to be able for providing setting function of the sensor 2 via a web page to a user, the developer needs to create a web page connecting module 115 and the web page connecting module 115 needs to have an independent web page data base 116 for storing definition of data and instructions corresponding to web page connecting function. In other words, if the gateway 1 is desired to be connected to more different external devices, e.g. IP cameras, Wi-Fi devices or other devices, different independent function modules and databases corresponding to different connecting functions need to created and that is a complicated task.

As mentioned above, when each system, module and database are coded by different programmers, their definitions of instruction formats and data may be different. Consequently, when these systems, modules and databases are integrated to construct a main operating system of the gateway 1, converting, compiling and integrating tasks may be necessary in case that communication protocols are different. That causes difficulty on development and increases high error occurrence rate.

Besides, when the developer wants to port certain programs to other electronic devices, e.g. porting the P2P connecting module 113 to a second gateway so as to enable the second gateway being able to provide P2P connecting function, porting may confront difficulties because the definition of the instruction format and data is different from programs already existed in the second gateway. Consequently, the developer needs to write independent programs for the second gateway to implement required functions and that causes lot of trouble.

SUMMARY OF INVENTION

A major objective of an embodiment according to the present invention is to provide a gateway using a single database. The P2P connecting function, web connecting function and definition of operating data and instructions of sensors are integrated in the gateway to prevent communication protocol problems that occur when systems and modules are separately developed in a main operating system of the gateway and to enhance developing and porting of firmware.

To achieve the aforementioned objective, the gateway of the embodiment according to the present invention at least has a microprocessor unit and a radio frequency (RF) module. The RF module is paired with one ore more than one external sensors for connection. There is an operating system operating on the microprocessor unit. There is an integrated control system in the main operating system. The integrated control system integrates and records P2P connecting function, web page connecting function and definition of operating data and instructions of sensors for the gateway. With the integration of the integrated control system, a sensor operating system in the main operating system, a P2P control module and a web page connecting module may share a main database for retrieving the same definition of data and instructions. With such, communication protocol problems among systems and modules in the operating system are decreased and such design enhances developing and porting of firmware.

In contrast with prior art, the present invention at least has an advantage of decreasing communication protocol converting problems that occur if systems and modules are integrated after development because in such design, it is not necessary for different firmware programmers separately developing firmware of a sensor control architecture, a P2P connecting architecture and a web page retrieving architecture before these architectures are combined. Moreover, such design enhances developing of firmware when the integrated control system integrates control instructions of different systems and modules and definition of corresponding data and stores these data in the same database. Besides, because the integrated control system includes the P2P connecting module and the main database, it is easy to enable another gateway to have P2P connecting function by directing porting the integrated control system to another gateway.

DETAILED DESCRIPTION

To better explain the features as well as technology contents of the present invention, please refer to the following description and associated drawings. Nevertheless, please note that these description and drawings are only for explanation not to limit the scope of the present invention.

Figure 1:
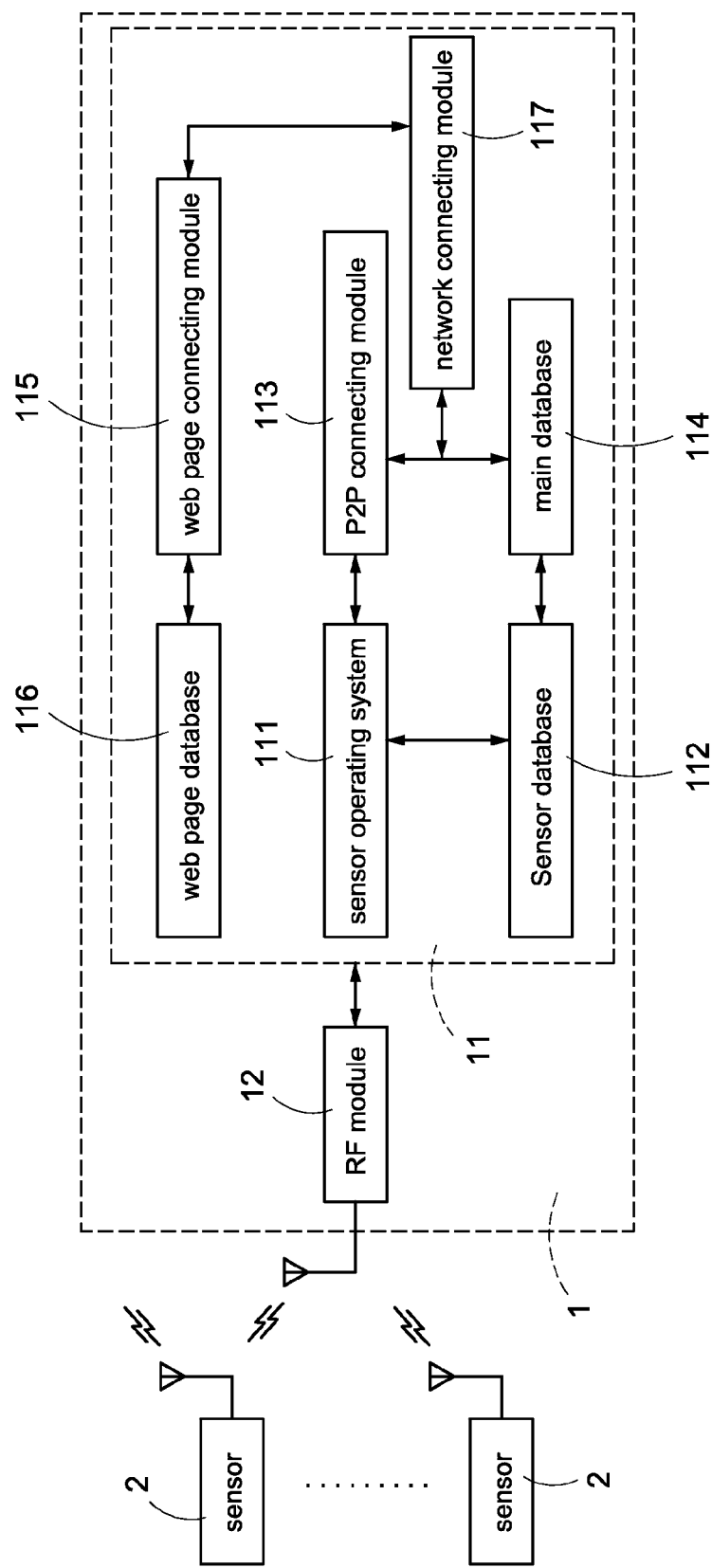
FIG. 1 is a diagram illustrating related art firmware on a gateway.
Figure 2:
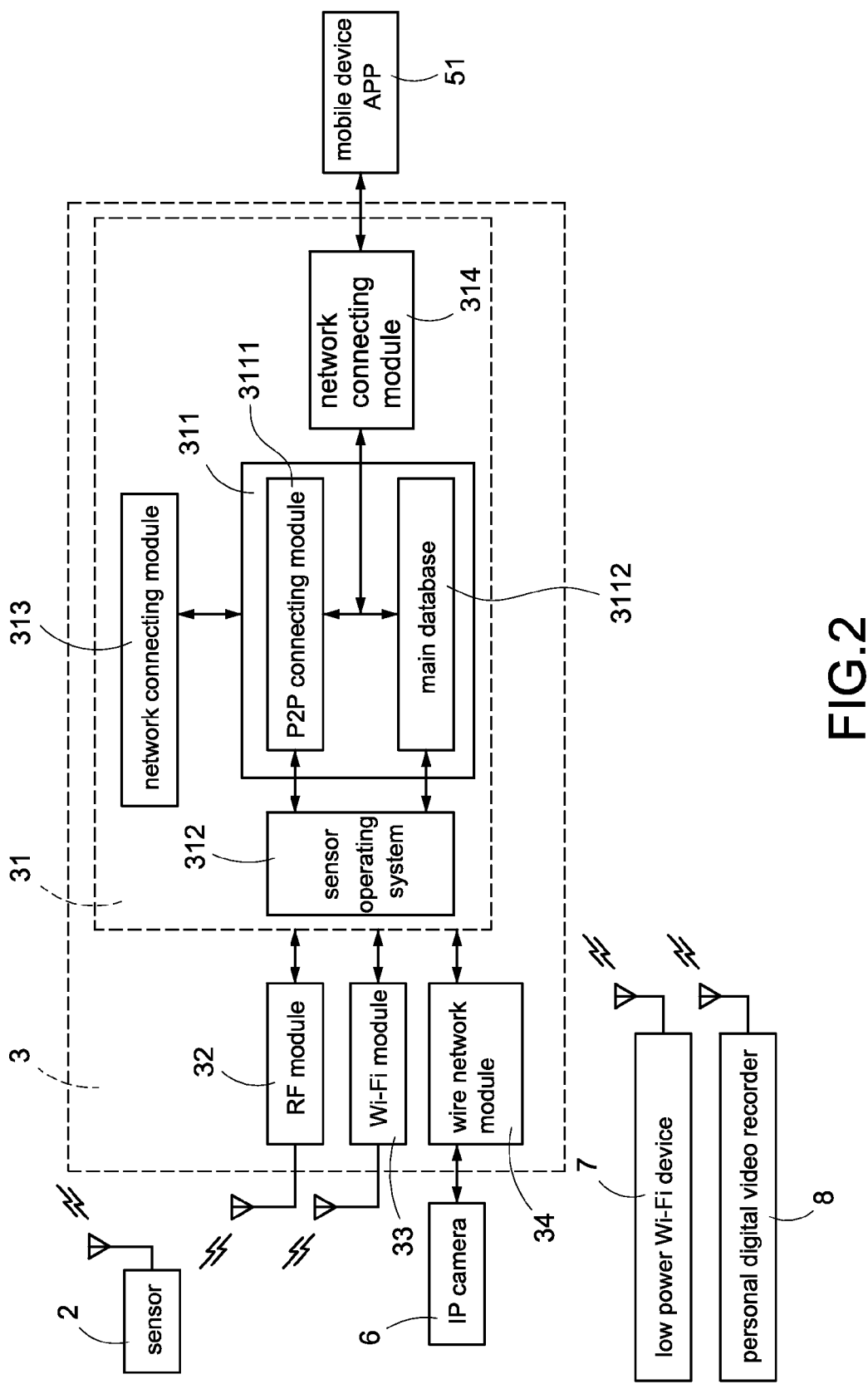
FIG. 2 is a firmware diagram of a gateway of a first embodiment according to the present invention.

Firstly, please refer to FIG. 2, which is a diagram showing a gateway of the first embodiment according to the present invention. In this embodiment, a gateway using a single database (hereinafter as the gateway 3) is introduced. The database mentioned here refers to an instruction set used by firmware, memory blocks used by programs for storing corresponding data and corresponding definition of instructions and data, not referring to databases like a hard drive or a server in hardware aspect.

As illustrated in FIG. 2, the gateway 3 of the embodiment includes a microprocessor unit 31 and a radio frequency (RF) module 32 electrically coupled to the microprocessor unit 31. The microprocessor unit 31 is used for executing a main operating system of the gateway 3 and performs a wireless paired connection to at least one external sensor 2 via the RF module 32. With such, the gateway 3 is able to control the paired sensor 2 and receives information replied by the sensor 2.

The main operating system includes an integrated control system 311, a sensor operating system 312, a web page connecting module 313 and a network connecting module 341. In this embodiment, the integrated control system 311, the sensor operating system 312, the web page connecting module 313 and the network connecting module 341 refer to different program parts of the main operating system and are identified by their corresponding functions.

The sensor operating system 312 establishes a communication connection with the sensor 2 via the RF module 32. Specifically, the sensor operating system 312 processes RF data of the sensor 2 after the gateway 3 is paired and connected to the sensor 2. The sensor operating system 312 transcodes different RF data so that the gateway 3 may adopt RF module 32 of different frequency segments to establish communication link with the sensor 2 of different frequency segments.

The integrated control system 311 connects the sensor operating system 312 and the network connecting module 314. The term 'connection' in this description refers to links among programs, not referring to connections among physical objects. The integrated control system 311 includes a main database 3112. The main database 3112 is used for recording definitions of operating data and instructions of systems and modules in the main operating system 3112. In addition, these definitions are unified by the integrated control system 311. In other words, each system and module in the main operating system 311 follows and uses unified definitions, like commands and data, recorded in the main database 3112. With such, after each system and module, e.g. the sensor operating system 312, the web page connecting module 131 and the network connecting module 314, is developed, integration of programs does not have communication protocol converting problems. In addition, developers do not need to establish separate and independent databases for the systems and modules. All systems and modules may retrieve corresponding definitions for processing instructions and data via the shared main database 3112.

The web page connecting module 313 connects to the integrated control system 311 and the gateway 3 operates a web page (not shown) via the web page connecting module 313. The web page uses an IP address assigned to the gateway 3. In this embodiment, the web page connecting module 313 may provide web page connecting function via the network connecting module 314. A user may use a browser on a computer or an APP (Application) on a mobile device to access the web page by inputting the IP address. The gateway 3 may provide setting function of the sensor 2 via the web page so that the user may pair the gateway 3 with the sensor 2 for connection. Besides, the gateway 3 may provide information of the paired sensor 2 via the web page so that the user may view such information via the computer or the mobile device.

In this embodiment, the integrated control system 311 unifies the web page connecting function and definition of operating data and instructions of the sensor 2 for the gateway 3, and stores all such definition together in the main database 3112. With such, program development schedule is shortened and probability of aforementioned problems is decreased.

Please be also noted that in addition to the RF module 32, the gateway 3 may further optionally include a Wi-Fi module 33 and a wire network module 34. With such, the gateway 3 may further be paired and connected with an IP camera 6, a low power Wi-Fi device 7, a personal digital video recorder (PDVR) 8 and other devices. The user may use the computer or the mobile device for connecting to the gateway 3 and use the setting function provided by the gateway 3 to pair with the aforementioned IP camera 6, low power Wi-Fi device 7, PDVR 8 for connection and for viewing information paired devices via the browser or the APP 51. In this embodiment, the main database 3112 also stores definition of corresponding data and instructions used by the IP camera 6, the low power Wi-Fi device 7 and the PDVR 8. Therefore, associated modules (not shown) in the microprocessor unit 31 may access the main database 3112 to retrieve instructions and data to communicate with the IP camera 6, the low power Wi-Fi device 7 and the PDVR 8.

The integrated control system 311 further includes a P2P connecting module 3111. The P2P connecting module 3111 provides P2P connecting function to the gateway 3 via the network connecting module 314. In this embodiment, the main operating system meanwhile unifies the P2P connecting function, the web page connecting function and definition of operating data and instructions for the sensor 2, the IP camera 6, the low power Wi-Fi device 7 or the PVDR 8 stores these data in the main database 3112. In other words, the P2P connecting module 3111 follows the same instruction format and corresponding data as that of the sensor operating system 312, the web page connecting module 313 and the network connecting module 314. With the P2P connecting module 3111, the gateway 3 may establish a P2P connection with a remote network device so that the remote network device may open the web page operated by the web page connecting module 313.

Please be also noted that the P2P connecting module 311, together with the main database 3112, is included in the integrated control system 311. Therefore, when the base operating system, e.g. Linux, is the same, the integrated control system 311 may be as whole ported to a microprocessor unit of another gateway or a router (not shown) so as to simplify development schedule of another gateway or the router.

Figure 3:
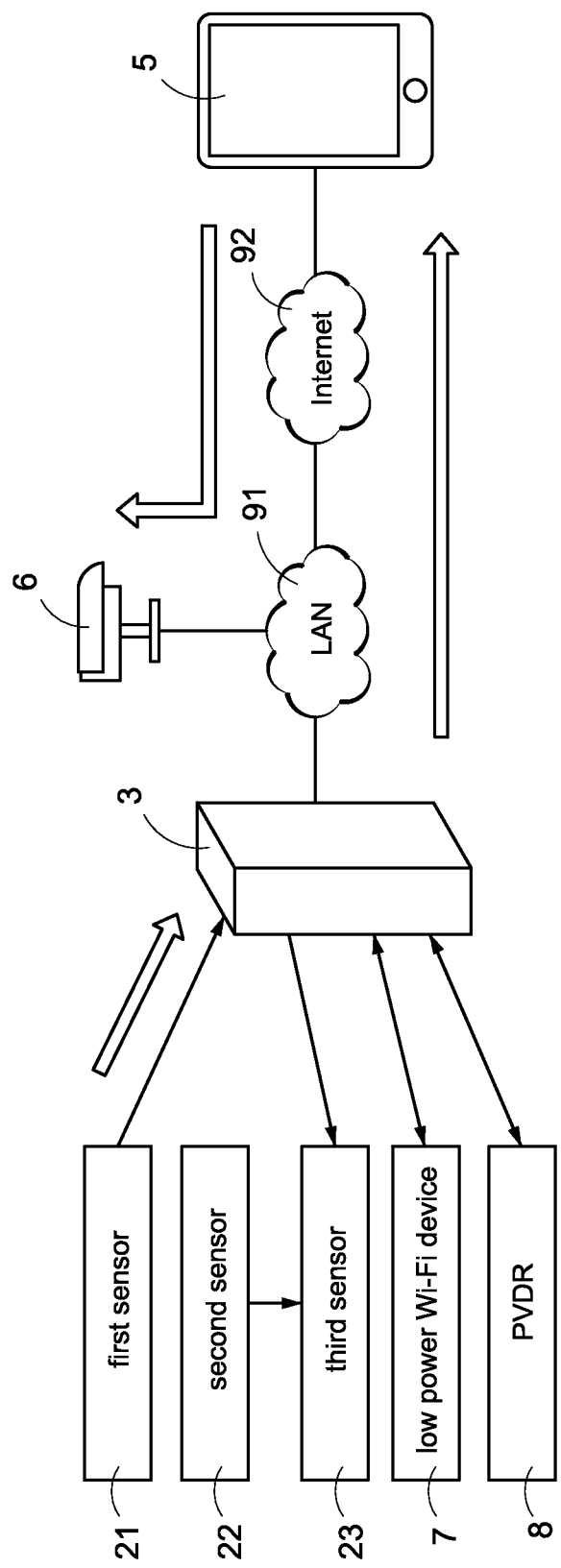
FIG. 3 illustrates connection of the gateway of the first embodiment according to the present invention.

In this embodiment, if a mobile device, like the mobile device 5 of FIG. 3, with the APP 51 and the gateway 3 are located within the same local area network (LAN), the mobile device may directly connect to the gateway 3 and opens the web page operated by the web page connecting module 313 so as to configure the sensor 2 and retrieves information of the sensor 2. In other cases, if the mobile device is at a remote side, i.e. not within the same LAN or not connected to the same router, the gateway 3 needs to establish a P2P connection with the mobile device 5 via the P2P connecting module 3111 before the mobile device 5 opens the web page with the APP 51. However, because there are various ways to perform P2P connection between two devices and they are not major focus of this disclosure, not further disclosure is provided for brevity.

Please refer to FIG. 3, which is a connecting diagram of a gateway of the first embodiment according to the present invention. In this embodiment, the RF module 32 may use frequency segments of 433/868/915 MHz. The sensor 2 may use corresponding frequency segments of 433/868/915 MHz by reference to the RF module 32 and implemented with sensors with unilateral-direction or bi-direction transmission function, but such configuration is not a limitation.

As an example, the first sensor 21, the second sensor 22 and the third sensor 23 are sensors with unilateral-direction communication function. The first sensor 21 transmits information to the gateway 3 but does not receive control instructions of the gateway 3. The second sensor 22 does not connect to the gateway 3 directly but connects to the third sensor 23. The third sensor 23 unilaterally receives control instructions from the gateway 3 but does not transmit information to the gateway 3. Nevertheless, please be noted that when sensors of bi-direction communication function are used, such sensors may not only receive control instructions from the gateway 3 or other sensors but also transmit information to connected gateway or other sensors.

Besides, the gateway 3 may connect to the low power Wi-Fi device 7 via Wi-Fi frequency, connect to the IP camera 6 via a wire network, connect to the PVDR 8, e.g. via 2.4 GHz non-Wi-Fi frequency segment, via a proprietary transmission protocol. All the description mentioned here is not for limitation but only serves as preferred examples.

The gateway 3 in the embodiment may be used in a Wireless House Security System (WHS). All sensors 21, 22, 23, the IP camera 6, the low power Wi-Fi device 7 and the PVDR 8 need to register on the gateway 3 and pair with the gateway 3 for connection in advance.

For example, if the user configures the first sensor 2 to be connected to the IP camera 6 when the first sensor 2 is triggered, the first sensor 2 actively transmits information to the gateway 3 when the first sensor 2 is triggered, and the gateway 3 transmits notice to the APP 51 that is connected to the gateway 3. In this embodiment, the APP 51 is installed on a mobile device 5 and the mobile device 5 is connected to the gateway 3 via the Internet 92. At such timing, the mobile device 5 is notified with the trigger activity so as have automatic or manual connection to the IP camera 6 and to provide instant images from the IP camera 6 to user. In this embodiment, the IP camera 6 and the gateway 3 are connected to the same LAN 91 but such configuration is not a limitation.

In another example, the second sensor 22 may be connected to the third sensor 23, and the third sensor 23 can only receive control instructions from the gateway 3. In such case, when the second sensor 22 is triggered, the second sensor 22 transmits information to the third sensor 23 to trigger the third sensor 23 to turn on. Because the third sensor 23 only can passively receive information, the gateway 3 does not know that the third sensor 23 has been activated. Nevertheless, the gateway 3 still is able to actively transmits control instructions to the third sensor 23 to control turn-on and turn-off of the third sensor 23.

In another example, the low power Wi-Fi device may be a camera or a detector serving as a sensor of another type. Moreover, based on characteristic of low power Wi-Fi protocol, the low power Wi-Fi device 7 may continuously retrieve information, e.g. photos, images, audio, of the location where the low power Wi-Fi device 7 is located and only transmits current information when specific events are triggered.

Besides, the PVDR 8 is similar to the IP camera 6. The difference is that although the PVDR 8 is connected to the gateway 3 via a public channel, e.g. via 2.4 GHz frequency segment, the PVDR 8 uses its proprietary transmission protocol to communicate with the gateway 3, not adopting common Wi-Fi or other RF transmission protocols.

Specifically, when a user wants to connect to the gateway 3, the mobile device 5 is used as a medium for connecting to a P2P connecting server (not shown) and for inquiring the P2P connecting server to obtain connecting information, e.g. device name or IP address, used by the gateway 3. With such, the user may further use the connecting information to issue connecting request to the gateway 3. After the gateway 3 receives the connecting request, an acknowledgement (ACK) signal is replied to the mobile device 5. The replied signal may include packets having the device name of the gateway 3 and having information of all devices connected behind the gateway 3, e.g. the sensor 2, the IP camera 6, the low power Wi-Fi device 7 and the PVDR 8. In addition, when more devices are behind the gateway 3, the packets contain more device information. Consequently, the mobile device 5 may know which devices may be paired for connection with the gateway 3 and further determines how to set the gateway 3 after receiving the replied signal.

Figure 4:
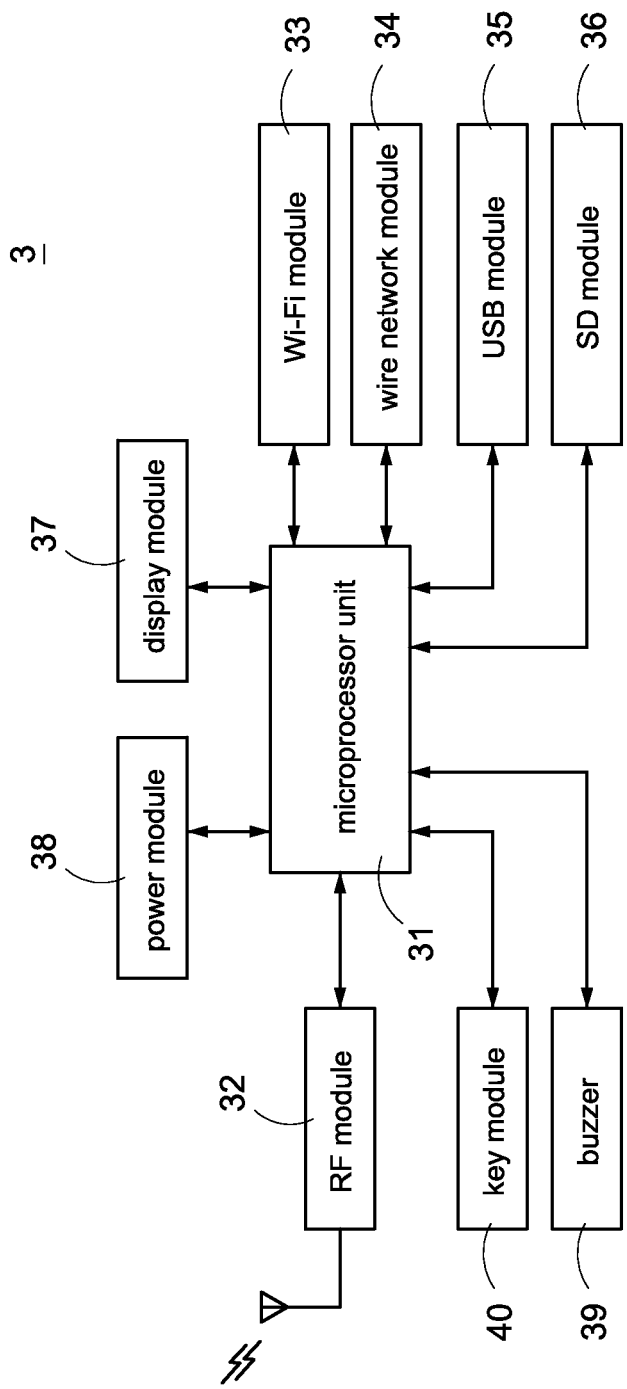
FIG. 4 is diagram of the gateway of the first embodiment according to the present invention.

Please refer to FIG. 4, which is a gateway diagram of the first embodiment according to the present invention. As illustrated in FIG. 4, in addition to the microprocessor 31, the RF module 32, the Wi-Fi module 33 and the wire network module 34, the gateway 3 includes an Universal Serial Bus (USB) module 34, a SD module 36, a display module 37, a power module 38, a buzzer 39 and a key module 40. Besides, these modules 31-40 are electrically connected to the microprocessor unit 31.

The gateway 3 may connect to a wireless network with the Wi-Fi module 33. Alternatively, the gateway 3 may connect to a wire network via a network wire when the wire network module 34 is connected to the network wire. Such configuration is not limited to these examples. In this embodiment, the wire network module 34 may be an RJ-45 connector. With the Wi-Fi module 33 and the wire network module 34, the gateway 3 may establish a network connection or a P2P connection with the mobile device 5. In addition, the gateway 3 may also download an updated firmware via a network, and update the main operating system with the updated firmware. Besides, the gateway 3 may also connect to the Wi-Fi module 33 and the wire network module 34 for connecting to external devices like the IP camera 6, the low power Wi-Fi device 7 or other devices.

Moreover, the gateway 3 may connect to an external storage like a USB storage device or a SD card via the USB module 35 or the SD module 36. With such, the gateway 3 may use the updated firmware of the USB storage or the SD card to update the main operating system.

The power module 38 is used for providing power for operating the gateway 3. The gateway 3 may receive information transmitted from the sensor 2 and the buzzer 39 may generate warning sounds when the sensor 2 is triggered.

As mentioned above, the RF module 32 may use frequency segments of 433/868/915 MHz to pair with the sensor 2 for connection according to different actual statuses of use areas or countries. Besides, the gateway 3 may use more than one RF modules 32 for actual requirement and apply different frequency segments for different RF modules 32. In this embodiment, the RF module 32 uses Serial Peripheral Interface (SPI) for connecting the microprocessor unit 32. But these disclosures should be regarded as limitation of the invention scope.

In another embodiment, the gateway 3 may also use the RF module 32 connecting to an external LCD display module (not shown). With such, the gateway 3 may use information of the gateway 3 and information of the sensor paired with the RF module 32 to be displayed on the LCD display module. Accordingly, the user may view complete information via the LCD display module.

As mentioned above, to save cost and reduce the size of the gateway 3, the gateway 3 may transmit complete information to the LCD display module to be display via the RF transmission. The display module 37 may be composed of a plurality of LEDs. But, all these disclosures are only examples instead of limitation of the invention. The plurality of LEDs are used for displaying pairing status for connecting to the sensor 2 and for displaying basic information after the pairing is completed. The key module 40 may be composed of multiple keys for receiving user input.

Figure 5:
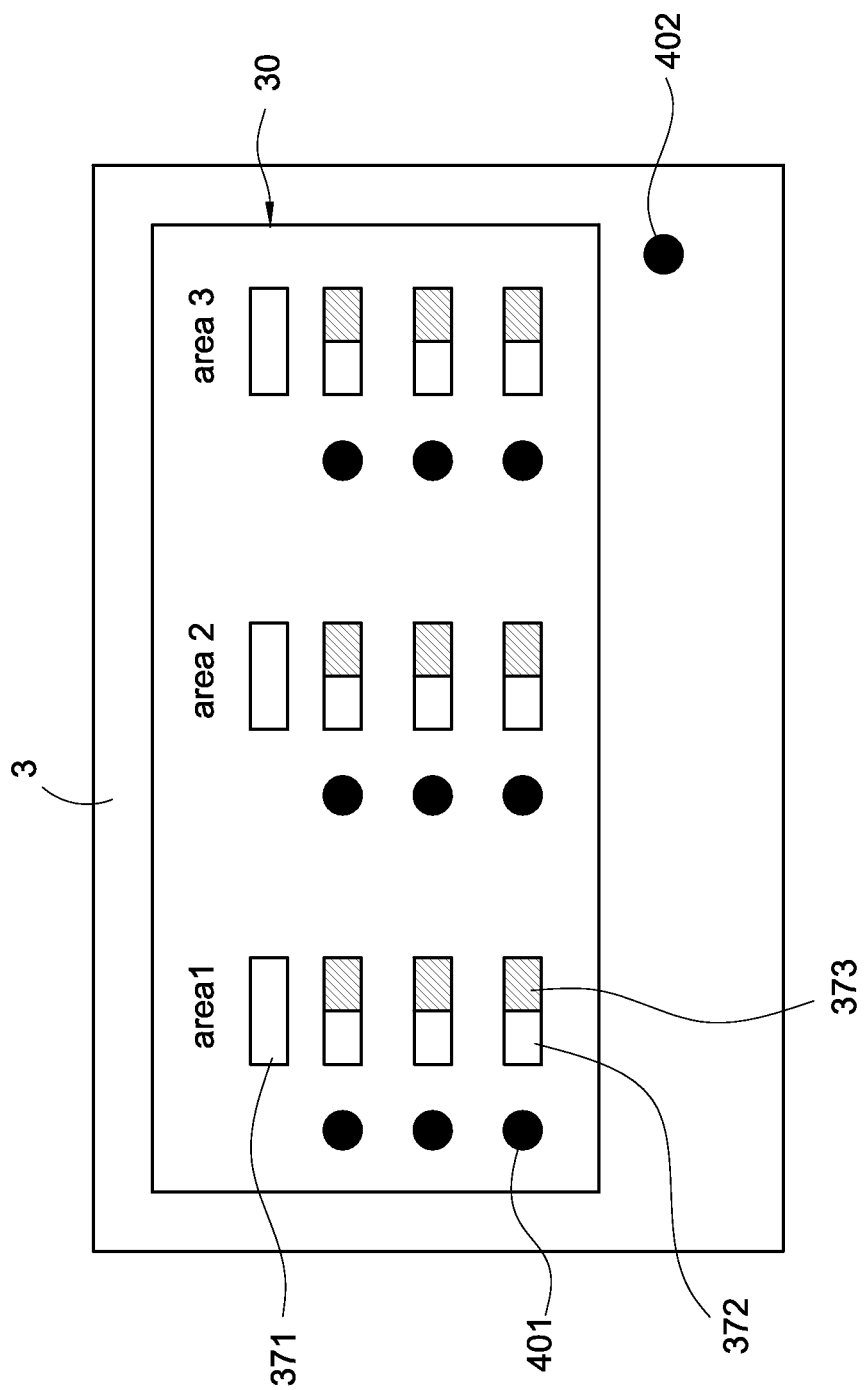
FIG. 5 is a display diagram of the first embodiment according to the present invention.

Please refer to FIG. 5, which is a display module diagram according to the first embodiment. In this embodiment, the gateway 3 has a housing that has an information panel 30. The display module 37 and the key module 40 are installed on the information panel 30. As illustrated in the drawing, the display module 37 may include at least one area display 371, at least one operation display 372 and at least one warning display 373. The key module 40 may include at least one setting key 401 and at least one warning clear key 402.

As mentioned above, the gateway 3 and at least one sensor 2 are used in a house security system. A house may include multiple areas, e.g. the area 1 to the area 3 illustrated in FIG. 5, and each area may further include one or more rooms, e.g. the room 1 to room 3 illustrated in FIG. 5. When any room in an area is disposed with the sensor 2, the area display 371 is turned on continuously to remind the user the area is paired with the sensor 2.

Each room has a corresponding setting key 401, at least one operating display 372 and at least one warning display 373. The user may use these setting keys 401 to set pairing of each room to the sensor 2. The gateway 3 may show pairing status, e.g. under pairing, paired successfully, pairing failure, by turning on/off of the operating display 372 and the warning display 373.

When the pairing is done, the gateway 3 uses the operating display 372, e.g. a green LED, and the warning display 373, e.g. a red LED, to display operating status of the sensor 2. For example, a display is turned on continuously to indicate that a paired sensor is operating normally. Next, when another sensor is triggered, out of order or has other conditions, a corresponding warning display keeps blinking to remind the user and the user may use the IP camera 6 to check the status of the room. The warning display 373 may be turned off when the condition is stopped. Or, the user may manually press the warning clear key 402 to cancel blinking status of the warning display 373.

With the present invention, a user may easily develop and integrate the operating system of the gateway 3. In addition, the user may connect to the gateway 3 from local side or remote side, configure pairing connection relation between the gateway 3 and one or more external devices and control the paired external devices.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A gateway using a single database, the gateway connecting to a mobile device via a network and comprising:
   a radio frequency (RF) module wirelessly connected to at least one external sensor, and the RF module being connected to an external LCD display module for displaying information of the gateway and information of the at least one sensor paired with the RF module on the LCD display module;
   a microprocessor unit electrically connected to the RF module, the microprocessor unit operating a main operating system, the main operating system comprising:
      a sensor operating system connected to the at least one sensor via the RF module for transcoding different radio frequency data;
      a network connecting module;
      an integrated control system connected to the sensor operating system and the network connecting module, the integrated control system comprising a point-to-point (P2P) module, and a main database for recording an unified P2P connecting function, an unified web page connecting function and definition of operating data and instructions of the at least one sensor, wherein the main database is an instruction set used by firmware or memory blocks used by programs for storing corresponding data and corresponding definition of instructions and data, and the P2P connecting module provides the P2P connecting function via the network connecting module, wherein the mobile device directly connects to the gateway and opens a web page operated by a web page connecting module so as to configure the at least one paired sensor and retrieves information of the sensor if the mobile device is located within same local area network with the gateway, and the mobile device configures the at least one paired sensor and retrieves information of the sensor after establishing a P2P connection with the gateway via the P2P connecting module if the mobile device is not located within the same local area network with the gateway; and
      a web page connecting module connected to the integrated control system, the web page connecting module operating the web page and providing the web page connecting function via the network connecting module, wherein the web page provides information of the at least one paired sensor and setting function of the at least one sensor; wherein the integrated control system, the sensor operating system, the web page connecting module and the network connecting module refer to different program parts of the main operating system and are identified by their corresponding functions;
   a key module electrically connected to the microprocessor unit for receiving external operating and performing pairing connection between the gateway and the at least one sensor, wherein the key module comprises at least one setting key and at least one warning clear key; and
   a display module electrically connected to the microprocessor unit for displaying pairing status when the at least one sensor being paired for connection and display operating status after the pairing being completed, wherein the display module comprises at least one area display, at least one operating display and at least one warning display.

2. The gateway using the single database of claim 1, further comprising a Wi-Fi module electrically connected to the microprocessor unit, the gateway being connected to a network via the Wi-Fi module.

3. The gateway using the single database of claim 1, further comprising a wire network module electrically connected to the microprocessor unit, the gateway being connected to a network via the wire network module.

4. The gateway using the single database of claim 1, further comprising a Universal Serial Bus (USB) module or a SD module, the USB module or the SD module electrically connected to the microprocessor unit, the gateway receiving an updated firmware via the USB module or the SD module and updating the main operating system of the updated firmware.

5. The gateway using the single database of claim 1, further comprising:

a buzzer electrically connected to the microprocessor unit generating warning sounds when the at least one sensor being triggered.

6. The gateway using the single database of claim 5, wherein the gateway comprises an information panel, the area display, the operating display, the warning display, the setting key and the warning clear key are respectively disposed on the information panel.

7. The gateway using the single database using the single database of claim 1, further comprising a power module electrically connected to the microprocessor unit for providing power of operation of the gateway.

8. The gateway using the single database of claim 1, wherein the RF module uses frequency segments of 433/868/915 MHz, 868 MHz, or 915 MHz, and is connected to the microprocessor unit via Serial Peripheral Interface (SPI).

* * * * *